(12) United States Patent
Shao (10) Patent No.: US 11,316,167 B2
(45) Date of Patent: Apr. 26, 2022

(54) ANODE ELECTRODE AND ELECTROCHEMICAL DEVICE CONTAINING THE SAME

(71) Applicant: NINGDE AMPEREX TECHNOLOGY LIMITED, Ningde (CN)

(72) Inventor: Ying Shao, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 248 days.

(21) Appl. No.: 16/201,033

(22) Filed: Nov. 27, 2018

(65) Prior Publication Data

US 2020/0106103 A1    Apr. 2, 2020

(30) Foreign Application Priority Data

Sep. 27, 2018   (CN) .......................... 201811130757.7

(51) Int. Cl.
   *H01M 4/66*     (2006.01)
   *H01M 10/0525*  (2010.01)
   *H01M 4/02*     (2006.01)

(52) U.S. Cl.
   CPC ....... *H01M 4/667* (2013.01); *H01M 10/0525* (2013.01); *H01M 2004/027* (2013.01)

(58) Field of Classification Search
   CPC .......................... H01M 4/667; H01M 10/0525
   See application file for complete search history.

(56) References Cited

U.S. PATENT DOCUMENTS

2018/0102522 A1*   4/2018   Yang ................... H01M 50/461

FOREIGN PATENT DOCUMENTS

| CN | 1949569 A   | 4/2007 |
| CN | 101313426 A | 11/2008 |
| CN | 101409339 A | 4/2009 |
| CN | 202772233 U | 3/2013 |
| CN | 103988341 A | 8/2014 |

(Continued)

OTHER PUBLICATIONS

Chinese Second Office Action dated Sep. 18, 2020, in counterpart Chinese application 201811130757.7, 12 pages.

(Continued)

*Primary Examiner* — Sarah A. Slifka
(74) *Attorney, Agent, or Firm* — Juan Carlos A. Marquez; Marquez IP Law Office, PLLC (57) ABSTRACT

The present application relates to an anode electrode and an electrochemical device containing the same. The anode electrode comprises: a current collector, including a first surface and a second surface opposite to the first surface; an insulation layer being disposed on a peripheral portion of the first surface and/or a peripheral portion of the second surface; and a protection layer being disposed on the insulation layer and covering the first surface and/or the second surface. According to an embodiment of the present application, the insulation layer and the protection layer are disposed in the anode electrode of the electrochemical device to construct a seal cavity, which defines a space of the deposition of lithium metal on the anode electrode, thereby resolving the safety problem caused by the irregular deposition of the lithium metal.

14 Claims, 6 Drawing Sheets

(56) References Cited

FOREIGN PATENT DOCUMENTS

| | | |
|---|---|---|
| CN | 204303913 U | 4/2015 |
| CN | 105074968 A | 11/2015 |
| CN | 106159169 A | 11/2016 |
| CN | 106684298 A | 5/2017 |
| CN | 107482224 A | 12/2017 |
| CN | 107946541 A | 4/2018 |
| CN | 107946543 A | 4/2018 |
| CN | 107946599 A | 4/2018 |
| CN | 108232117 A | 6/2018 |
| CN | 108346775 A | 7/2018 |
| JP | H05275118 A | 10/1993 |
| KR | 20180027953 A | 3/2018 |

OTHER PUBLICATIONS

Chinese First Office Action dated Mar. 31, 2020, in counterpart Chinese application 201811130757.7, 16 pages.

\* cited by examiner

ANODE ELECTRODE AND ELECTROCHEMICAL DEVICE CONTAINING THE SAME

CROSS REFERENCE TO RELATED APPLICATIONS

The present application claims the benefit of priority from the China Patent Application No. 201811130757.7, filed on 27 Sep. 2018, the disclosure of which is hereby incorporated by reference in its entirety.

BACKGROUND

1. Field of the Invention

The present application relates to the technical field of electrochemical devices, and more specifically to an anode electrode having a sealed insulation structure and an electrochemical device containing the anode electrode.

2. Description of the Related Art

In current electrochemical devices (for example, a lithium ion battery), in order to improve energy density thereof, one of the solutions employed is replacing common graphite material with lithium metal material in an anode electrode. However, this solution may cause an irregular deposition of lithium metal on the anode electrode, and such irregular deposition may extend through the anode electrode. Thus, the foregoing anode electrode may further form a lithium metal deposition in contact with a current collector of or a tab of a cathode electrode, and may further cause a problem that results in a short-circuit or fails occurred in the electrochemical device.

In view of this, the structure of the anode electrode needs to be further improved to approach an electrochemical device with higher energy density.

SUMMARY

The present application seeks to solve at least one of the problems existing in the related field to at least some extent by providing an anode electrode and an electrochemical device comprising the anode electrode.

According to some embodiments of the present application, the present application provides an anode electrode, comprising: a current collector, comprising a first surface and a second surface opposite to the first surface; an insulation layer being disposed on a peripheral portion of the first surface and/or a peripheral portion of the second surface; and a protection layer being disposed on the insulation layer and covering the first surface and/or the second surface.

In some embodiments, the protection layer is in direct contact with at least one portion of the first surface and/or at least one portion of the second surface of the current collector, and the porosity of the protection layer ranges from approximately 0% to approximately 60%.

In some embodiments, the first surface and/or the second surface of the current collector respectively define a cavity, with the protection layer and the insulation layer, respectively; and the porosity of the protection layer ranges from approximately 20% to approximately 60%.

In some embodiments, the thickness of the protection layer ranges from approximately 1 µm to approximately 50 µm.

In some embodiments, the insulation layer is an ionic and electronic insulator, and the protection layer either has ionic conductivity or is a porous non-ionic conductor.

In some embodiments, the thickness of the insulation layer ranges from approximately 3 µm to approximately 80 µm, and the width thereof ranges from approximately 0.5 mm to approximately 20 mm. In some other embodiments, the thickness of the insulation layer ranges from approximately 5 µm to approximately 50 µm, and the width thereof ranges from approximately 0.5 mm to approximately 10 mm.

In some embodiments, the insulation layer is selected from the group consisting of: polyimide, polyamide, polyvinyl fluoride, polyetheretherketone, polyethylene, polypropylene, polyvinylidene chloride, polytetrafluoroethylene, polyurethane, aluminum oxide, aluminum hydroxide, boron nitride, and their derivatives and a combination thereof.

In some embodiments, the material of the protection layer comprises polymer or a mixture of polymer and inorganic material, where the polymer is selected from the group consisting of: polypropylene, polyethylene, polyvinylidene fluoride-hexafluoropropylene, polyvinylidene fluoride, polyacrylonitrile, polymethylmethacrylate, polyphenylether, propylene carbonate, polyethylene oxide, and a combination thereof; and the inorganic material is selected from the group consisting of: $HfO_2$, $SrTiO_3$, $SnO_2$, $CeO_2$, $MgO$, $NiO$, $CaO$, $BaO$, $ZnO$, $ZrO_2$, $Al_2O_3$, $TiO_2$, $SiO_2$, $Li_3PO_4$, $Li_2O$, $LiF$, $LiOH$, $Li_2CO_3$, $LiAlO_2$, $Li_2O$—$Al_2O_3$—$SiO_2$—$P_2O_5$—$TiO_2$—$GeO_2$ ceramic material, $Li_{1+x+y}(Al, Ga)_x(Ti, Ge)_{2-x}Si_yP_{3-y}O_{12}$, where $0 \le x \le 1$ and $0 \le y \le 1$, lithium titanium phosphate $(Li_xTi_y(PO_4)_3$, where $0<x<2$ and $0<y<3)$, lithium-aluminum-titanium phosphate $(Li_xAl_yTi(PO_4)_3$, where $0<x<2$, $0<y<1$, and $0<z<3)$, lithium lanthanum titanate $(Li_xLa_yTiO_3$, where $0<x<2$ and $0<y<3)$, lithium germanium thiophosphate $(Li_xGe_yP_zS_w$, where $0<x<4$, $0<y<1$, $0<z<1$, and $0<w<5)$, lithium nitride $(Li_xN_y$, where $0<x<4$ and $0<y<2)$, $SiS_2$ glass material $(Li_xSi_yS_z$ where $0 \le x<3$, $0<y<2$, and $0<z<4)$, $P_2S_5$ glass material $(Li_xP_yS_4$ where $0 \le x<3$, $0<y<3$, and $0<z<7)$, garnet ceramic material $(Li_{3+x}La_3M_2O_{12}$, where $0 \le x \le 5$, and M is Te, Nb, or Zr), and a combination thereof.

In some embodiments, the anode electrode further comprises two or more protection layers.

In some embodiments, the insulation layer is further disposed on a lateral side of the current collector.

In some embodiments, the insulation layer is disposed on the peripheral portion of the first surface and the entire second surface; and the protection layer is disposed on the insulation layer and covers the first surface.

Another embodiment of the present application provides an electrochemical device comprising the anode electrode according to the present application.

In some embodiments, the electrochemical device is a lithium ion battery.

The additional aspects and advantages of the embodiments of the present application are described and illustrated in part in the subsequent description, or explained by the implementation of the embodiments of the present application.

BRIEF DESCRIPTION OF THE DRAWINGS

Drawings required for describing the embodiments of the present application or the prior art will be briefly described below to facilitate description on the embodiments of this application. Obviously, the drawings described below are merely some embodiments in the present application. A person skilled in the art can still obtain the drawings of other embodiments according to the structures illustrated in the appended drawings without inventive efforts.

DETAILED DESCRIPTION

Embodiments of the present application are described below in detail. Throughout the specification, the same or similar components and components having the same or similar functions are denoted by similar reference numerals. The embodiments described herein with respect to the accompanying drawing are illustrative and schematic, and are used to provide basic understanding for the present application. Although the present application is described with reference to specific implementations, the embodiments of the present application should not be construed as limitations to the present application. On the contrary, the invention of the present application would cover any alternative, improved, or equivalent manner included in the scope and equivalent manners defined by the attached claims.

In the present application, unless otherwise particularly indicated or limited, relativistic wordings such as "central", "longitudinal", "lateral", "front", "back", "right", "left", "inner", "outer", "relatively low", "relatively high", "horizontal", "vertical", "higher than", "lower than", "above", "below", "top", "bottom", and their derived wordings (such as "horizontally", "downward", and "upward") should be construed as referenced directions described in discussion or shown in the appended drawings. These relativistic wordings are merely used for ease of description, and do not require constructing or operating the present application in a specific direction.

As used in the present application, terms "approximately", "substantially", "essentially", and "about" are used for describing and explaining a small variation. When being used in combination with an event or a situation, the terms can refer to an example in which the event or situation occurs exactly as intended or to an example in which the event or situation occurs similarly to as was intended. For example, when being used in combination with a value, the terms may refer to a variation range being less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two values is less than or equal to ±10% of an average value of the value (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), it could be considered that the two values are "substantially" the same.

In addition, sometimes, a quantity, a ratio, and another value are presented in a range format in the present application. It should be understood that such a range format is used for convenience and conciseness, should be flexibly understood, and not only includes a value that is explicitly specified as being limited in a range, but also includes all individual values or sub-ranges included within the range, as if each value and each sub-range are explicitly specified.

Further, to facilitate description, "first", "second", "third", and the like may be used in the present application to distinguish among different components in a diagram or a series of diagrams. The wordings "first", "second", "third", and the like are not intended to describe corresponding components.

In the present application, unless particularly specified or defined, "dispose," "connect," "couple," "fix," and similar wordings are widely used, and a person skilled in the art can understand, according to specific situations, that the above-described wordings may indicate, for example, a fixed connection, a detachable connection, or an integrated connection, alternatively, the wordings may indicate a mechanical connection or an electrical connection, alternatively, the wordings may also indicate a direct link or an indirect link through an intermediary structure, and alternatively, the words may indicate internal communication between two components.

In prior research for preventing an irregular deposition of lithium metal in an electrochemical device (for example, a lithium ion battery), Chinese patents CN202772233U and CN204303913U propose using a ceramic coating on the surface of an electrode to prevent it from generating a burr, thereby preventing a short-circuit caused by the burr penetrating through the separator thereof. In addition, Chinese patents CN101313426B and CN106684298A propose using polymer material as insulating material for the protection of anode electrode and cathode electrode or an entire electrode assembly. The above Chinese patents illustrate specific embodiments of several types of ceramic material and polymer material and are incorporated herein by reference in their entirety.

Based on the disclosed insulating material, the present application provides an anode electrode having an insulating material structure, where a sealed cavity is constructed by adhering an insulation layer to a anode current collector and a protection layer respectively, to limit the direction and extent of the deposition of lithium metal, thereby resolving a safety problem that may be caused due to the irregular deposition of lithium metal on an anode electrode.

The anode electrode of the present application comprises: a current collector, comprising a first surface and a second surface opposite to the first surface; an insulation layer being disposed on a peripheral portion of the first surface and/or a peripheral portion of the second surface; and a protection layer being disposed on the insulation layer and covering the first surface and/or the second surface. The insulation layer disposed on the peripheral portion of the surface of the current collector is adhered to the protection layer, so as to limit the deposition of lithium metal within a sealed cavity between the protection layer and the current collector, so that the lithium metal cannot be deposited in an extent outside the sealed cavity.

Figure 1:
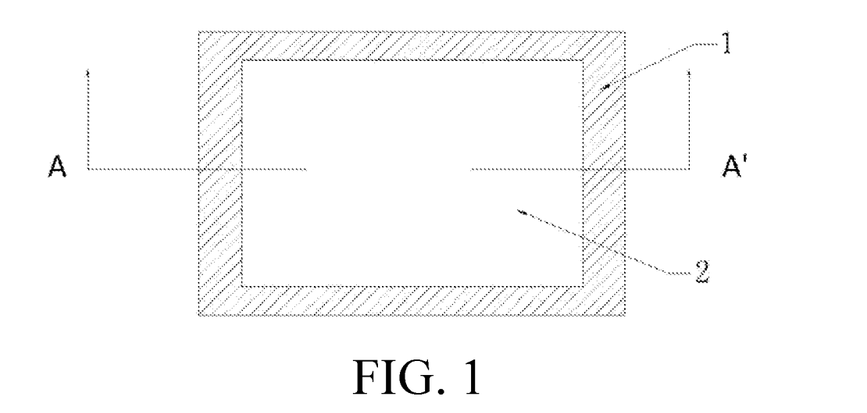
FIG. 1 is a schematic planar diagram of a top-viewed structure of an insulation layer on an anode electrode current collector according to some embodiments of this application.
Figure 2:
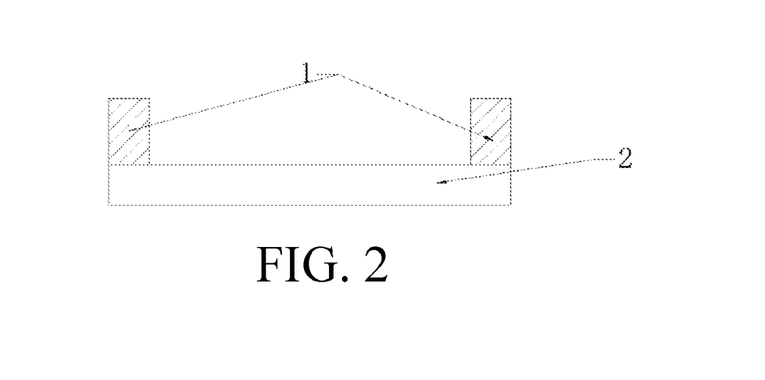
FIG. 2 is a cross-sectional view along the A-A' line shown in FIG. 1.

FIG. 1 is a schematic planar diagram of a top-viewed structure of an insulation layer on an anode current collector according to some embodiments of the present application, and FIG. 2 is a cross section view of a longitudinal structure of the anode electrode along an the A-A' line in FIG. 1. As shown in FIG. 1 and FIG. 2, the insulation layer 1 is disposed on a peripheral portion of a first surface of a current collector 2 and forms a complete surrounding structure. In some embodiment of the present application, the thickness of the insulation layer ranges from approximately 3 μm to approximately 80 μm, and the width thereof ranges from approximately 0.5 mm to approximately 20 mm. In some other embodiments, the thickness of the insulation layer ranges from approximately 5 μm to approximately 50 μm, and the width thereof ranges from approximately 0.5 mm to approximately 10 mm.

According to embodiments of the present application, the insulation layer is an ionic and electronic insulator to prevent any lithium ion from being deposited on its surface. Material of the insulation layer may be selected from, but is not limited to, polyester, polyolefin macromolecular polymer or inorganic ceramic. In some embodiments of the present application, the insulation layer may be selected from the group consisting of: polyimide (PI), polyamide (PA), polyvinyl fluoride (PVF), polyetheretherketone (PEEK), polyethylene (PE), polypropylene (PP), polyvinylidene chloride (PVDC), polytetrafluoroethylene (PTFE), polyurethane (PU), aluminum oxide, aluminum hydroxide, boron nitride and their derivatives and a combination thereof.

Figure 3:
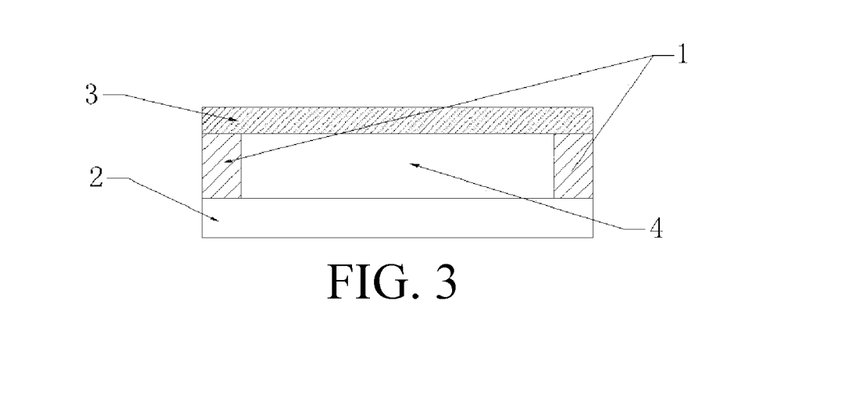
FIG. 3 is a cross-sectional view of a longitudinal structure of an anode electrode according to some embodiments of this application.

FIG. 3 is a cross-sectional view of a longitudinal structure of an anode electrode according to some embodiments of the present application. As shown in FIG. 3, the anode electrode comprises a current collector 2 comprising a first surface and a second surface opposite to the first surface; an insulation layer 1 being disposed on a peripheral portion of the first surface; and a protection layer 3 being disposed on the insulation layer and covering the first surface. The protection layer 3, the insulation layer 1, and the first surface of the current collector 2 define a cavity 4.

Figure 4:
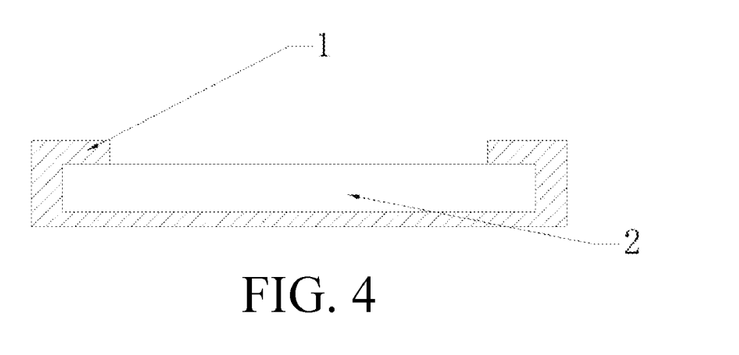
FIG. 4 is a cross-sectional view of a longitudinal structure of an insulation layer on an anode current collector according to some other embodiments of this application.
Figure 5:
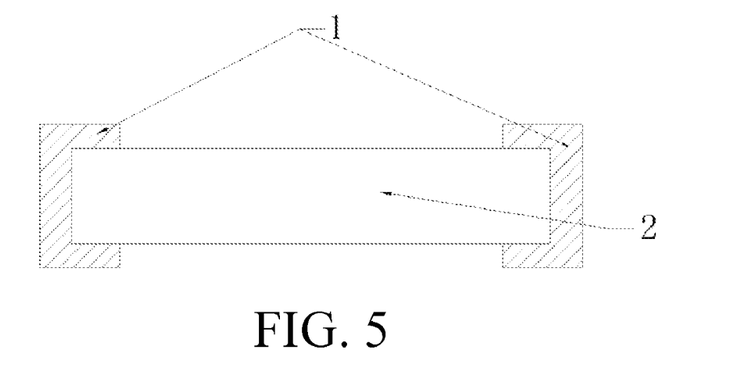
FIG. 5 is a cross-sectional view of a longitudinal structure of an insulation layer on an anode current collector according to some other embodiments of this application.

FIG. 4 and FIG. 5 are cross-sectional views of a longitudinal structure of an insulation layer on an anode current collector according to some other embodiments of the present application. As shown in FIG. 4, in some embodiments of this application, the insulation layer 1 can be disposed on the peripheral portion of the first surface and the entire second surface of the current collector 2, and the insulation layer may be further disposed on a lateral side of the current collector 2. As shown in FIG. 5, in some other embodiments of the present application, the insulation layer 1 can be further disposed on the peripheral portion of the first surface and the peripheral portion of the second surface of the current collector 2, and the insulation layer may be disposed on the lateral side of the current collector 2.

Although the insulation layer 1 in both FIG. 4 and FIG. 5 forms a complete surrounding structure on the lateral side of the current collector 2, FIG. 4 and FIG. 5 herein are merely used to represent schematic diagrams of a structure that the insulation layer 1 possibly forms. A person skilled in the art should clearly understand that the structure of the insulation layer of the anode electrode according to embodiments of the present application may be adjusted based on different uses and specific requirements. For example, the structure of the insulation layer may be a single-sided insulation layer structure or a double-sided insulation layer structure. In addition, the insulation layer may completely or partially surrounding the lateral side of the current collector 2 based on specific requirements.

Figure 6:
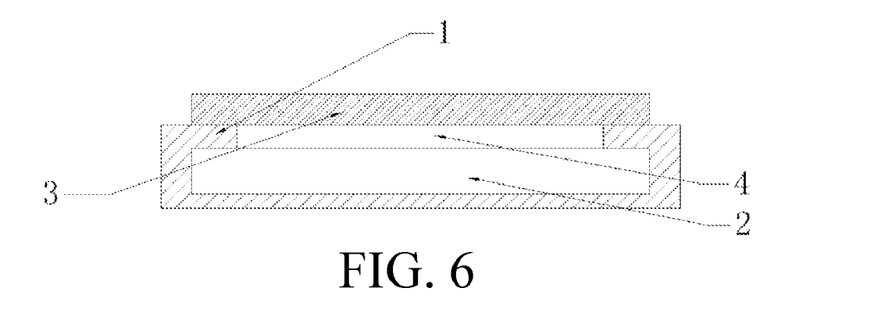
FIG. 6 is a cross-sectional view of a longitudinal structure of an anode electrode according to some other embodiments of this application.
Figure 7:
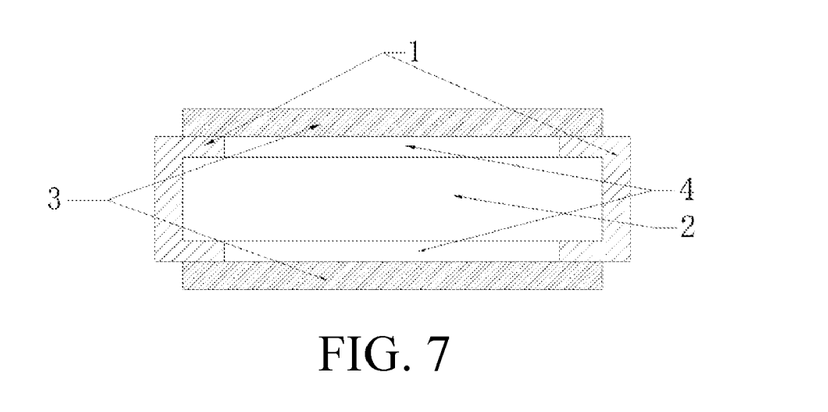
FIG. 7 is a cross-sectional view of a longitudinal structure of an anode electrode according to some other embodiments of this application.

FIG. 6 and FIG. 7 are cross-sectional views of a longitudinal structure of an anode electrode according to some other embodiments of the present application.

As shown in FIG. 6, the anode electrode comprises a current collector 2 comprising a first surface and a second surface opposite to the first surface; an insulation layer 1 being disposed on a peripheral portion of the first surface; and a protection layer 3 being disposed on the insulation layer and covering the first surface. In addition, the insulation layer 1 is further disposed on the entire second surface and the lateral side of the current collector 2. In some embodiments of the present application, the protection layer 3, the insulation layer 1, and the first surface of the current collector 2 define a cavity 4.

As shown in FIG. 7, the anode electrode comprises a current collector 2 comprising a first surface and a second surface opposite to the first surface; an insulation layer 1 being disposed on the first surface and a peripheral portion of the second surface; and a protection layer 3 being disposed on the insulation layer separately and covering the first surface and the second surface. In addition, the insulation layer 1 further completely covers the lateral side of the current collector 2. The protection layer 3, the insulation layer 1, and the first surface of the current collector 2 define a plurality of cavities 4.

Figure 8:
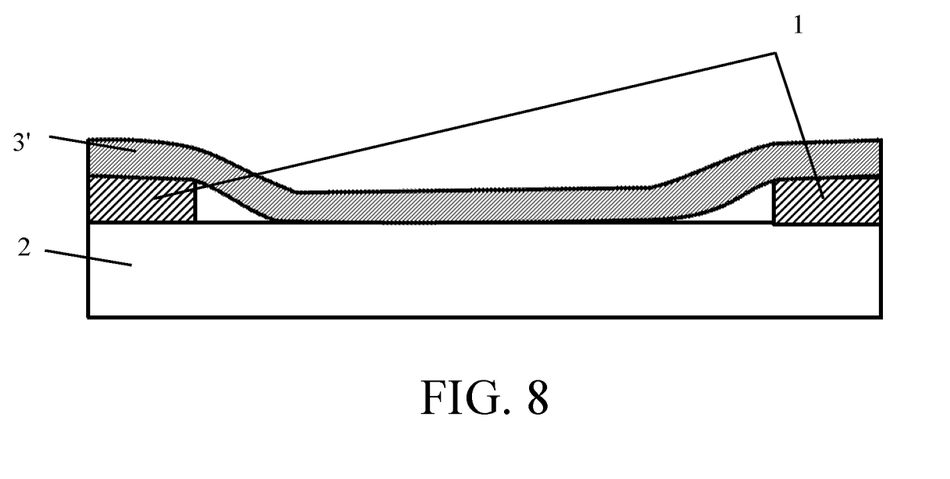
FIG. 8 is a cross-sectional view of a longitudinal structure of an anode electrode according to some other embodiments of this application.

Although the protection layer 3 in the anode electrode shown in FIG. 3, FIG. 6, and FIG. 7 is a flat sheet-shaped structure that is parallel to and not in contact with the current collector, FIG. 3, FIG. 6, and FIG. 7 herein are merely used for representing schematic structural diagrams of the protection layer. A person skilled in the art should clearly understand that the protection layer 3 may be either a flexible film-shaped structure or a rigid sheet-shaped structure. For example, the protection layer 3 may be a flexible film in any shape or a rigid layer in a fixed shape. In some embodiments of the present application, the protection layer 3 is not in direct contact with the surface of the current collector 2, where the porosity of the protection layer 3 ranges from approximately 20% to approximately 60%. In some other embodiments of the present application, as shown in FIG. 8, the protection layer 3' may be in direct contact with at least one portion of the first surface and/or at least one portion of the second surface of the current collector 2, where the porosity of the protection layer 3' ranges from approximately 0% to approximately 60%.

In some embodiments of the present application, the thickness of the protection layer 3 ranges from approximately 1 μm to approximately 50 μm. In addition, the protection layer 3 may have different permeabilities of the electrolytic solution depending on the materials, processes thickness or porosity selected. Specifically, the way of lithium ions depositing in the cavity 4 are different depending on whether or not the electrolyte can reach the cavity 4. For example: 1) if material with low permeability of the electrolytic solution, such as dense polyethylene oxide (PEO), is used as material for the protection layer, the electrolytic solution cannot enter the cavity 4. That is, there is no electrolyte in the cavity 4, the protection layer 3 needs to come into direct contact with at least one portion of the first surface and/or at least one portion of the second surface of the current collector 2, and the deposition of lithium ions is preferentially started at a position where the current collector is in contact with the protection layer; and 2) if material with high permeability of electrolytic solution is used as material for the protection layer, such as single-layered pore-broached polyethylene (PE) material (i.e., the protection layer 3 is porous), the electrolyte is still contained in the cavity 4, and the lithium ions are deposited through the electrolytic solution on the surface of the current collector. Accordingly, when the deposited lithium metal jacks up the protection layer, due to the specific mechanical strength of the protection layer, the protection layer will limit the growth of the deposition of the lithium metal in a direction perpendicular to the first surface of the current collector, and instead, the lithium ions tend to grow in a direction substantially parallel to the first surface, thereby preventing a safety problem caused by irregular deposition of lithium ions.

In some embodiments of the present application, the material of the protection layer may comprise, but is not limited to, polymer or a mixture of polymer and inorganic material.

In some embodiments of the present application, the polymer of the protection layer is selected from the group consisting of: polypropylene (PP), polyethylene (PE), polyvinylidene fluoride-hexafluoropropylene (PVDF-HFP), polyvinylidene fluoride (PVDF), polyacrylonitrile (PAN), polymethylmethacrylate (PMMA), polyphenylether (PPO), propylene carbonate (PPC), polyethylene oxide (PEO) and a combination thereof; and the inorganic material is selected from the group consisting of: $HfO_2$, $SrTiO_3$, $SnO_2$, $CeO_2$, MgO, NiO, CaO, BaO, ZnO, $ZrO_2$, $Al_2O_3$, $TiO_2$, $SiO_2$, $Li_3PO_4$, $Li_2O$, LiF, LiOH, $Li_2CO_3$, $LiAlO_2$, $Li_2O$—$Al_2O_3$—$SiO_2$—$P_2O_5$—$TiO_2$—$GeO_2$ ceramic material, $Li_{1+x+y}(Al, Ga)_x(Ti, Ge)_{2-x}Si_yP_{3-y}O_{12}$, where $0 \leq x \leq 1$ and $0 \leq y \leq 1$, lithium titanium phosphate $(Li_xTi_y(PO_4)_3$, where $0 < x < 2$ and $0 < y < 3)$, lithium-aluminum-titanium phosphate $(Li_xAl_yTi_z(PO_4)_3$, where $0 < x < 2$, $0 < y < 1$, and $0 < z < 3)$, lithium lanthanum titanate $(Li_xLa_yTiO_3$, where $0 < x < 2$ and $0 < y < 3)$, lithium germanium thiophosphate $(Li_xGe_yP_zS_w$, where $0 < x < 4$, $0 < y < 1$, $0 < z < 1$, and $0 < w < 5)$, lithium nitride $(Li_xN_y$, where $0 < x < 4$ and $0 < y < 2)$, $SiS_2$ glass material $(Li_xSi_yS_z$, where $0 \leq x < 3$, $0 < y < 2$, and $0 < z < 4)$, $P_2S_5$ glass material $(Li_xP_yS_z$, where $0 \leq x < 3$, $0 < y < 3$, and $0 < z < 7)$, garnet ceramic material $(Li_{3+x}La_3M_2O_{12}$, where $0 \leq x \leq 5$, and M is Te, Nb, or Zr), and a combination thereof.

In some embodiments of the present application, the method of disposing the insulation layer on the current collector comprises, but is not limited to, one or more of methods selected from coating, heat pressing, or gluing. In addition, the method of disposing the protection layer on the insulation layer comprises, but is not limited to, one or more of methods selected from depositing, heat pressing, or gluing. The heat pressing is conducted through pressing two to-be-adhered material layers at a specified temperature under a specific pressure by using two, upper and lower, pressing plates, where the two, upper and lower, pressing plates may be, but are not limited to, metal pressing plates such as stainless pressing plates. In some embodiments of the present application, the temperature of the heat pressing ranges from the room temperature to the minimum value of melting points of the two to-be-adhered material layers, the pressure ranges from approximately 0.1 Mpa to approximately 10 Mpa, and a time period of the heat pressing ranges from approximately 1 second to approximately 10 seconds. The gluing is conducted through coating a layer of binder to bond the two to-be-adhered material layers. In some embodiments of the present application, the binder may be selected from one or more of the group consisting of polyamide (PA), polyurethane (PU), ethylene vinylacetate copolymer (EVA), ethylene-vinyl alcohol copolymer (EVOH), and acrylic ester (acrylic resin).

In some embodiments of the present application, when the protection layer is a flexible film in any shape, whether the protection layer is in direct contact with the surface of the current collector can still be controlled by using a process condition. For example, the protection layer is adhered to the insulation layer in a tensioned state, such that the protection layer, the insulation layer, and the surface of current collector may define a cavity, thereby preventing the protection layer from being in direct contact with the surface of the current collector.

In some embodiments of the present application, the current collector in the anode electrode may be, but is not limited to, copper foil or nickel foil.

In some embodiments of the present application, the anode electrode further comprises anode material capable of absorbing and releasing lithium (Li) (sometimes referred to as "anode material capable of absorbing/releasing lithium (Li)" below). Examples of the anode material capable of absorbing/releasing lithium (Li) may comprise carbon material, a metallic compound, oxide, sulfide and nitride of lithium, such as $LiN_3$, lithium metal, metal forming an alloy with lithium, and polymer material.

Examples of carbon material may comprise low graphitized carbon, easy-to-graphitize carbon, artificial graphite, natural graphite, mesophase carbon microspheres, soft carbon, hard carbon, pyrolytic carbon, coke, vitreous carbon, a sintered body of an organic polymer compound, carbon fiber, and activated carbon. The coke may include pitch coke, needle coke, and petroleum coke. The sintered body of an organic polymer compound refers to a material obtained by calcining a polymer material such as a phenol plastic or a furan resin at a suitable temperature to carbonize it, and some of the materials are classified into low graphitized carbon or easy-to-graphitize carbon. Examples of the polymer material may comprise polyacetylene and polypyrrole.

Among these anode materials capable of absorbing/releasing lithium (Li), a material whose charging and discharging voltages are close to the charging and discharging voltages of lithium metal is selected. This is because the lower the charging and discharging voltages of the anode material are, the more likely the lithium-ion battery has a higher energy density. The anode material may be a carbon material because their crystal structures are only slightly changed during charging and discharging, and therefore, a good cycle performance and large charging and discharging capacities can be obtained. In particular, graphite may be selected because it can provide a large electrochemical equivalent and a high energy density.

In addition, the anode material capable of absorbing/releasing lithium (Li) may comprise elementary lithium metal, metal elements and a semimetal element capable of forming alloys together with lithium (Li) alloys and compounds comprising such elements, and the like. Particularly, the anode material and the carbon material are used together because in this case, good cycle performance and high energy density can be obtained. In addition to the alloys including two or more metal elements, the alloys used herein further comprise alloys containing one or more metal elements and one or more semimetal elements. The alloys may be in the form of a solid solution, an eutectic crystal (an eutectic mixture), an intermetallic compound, and a mixture thereof.

Examples of the metal elements and the semimetal elements may comprise tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), and hafnium (Hf). Examples of the above alloys and compounds may include a material having a chemical formula: $Ma_sMb_tLi_u$ and a material having a chemical formula: $Ma_pMc_qMd_r$. In these chemical formulas, Ma represents at least one of the metal elements and semimetal elements capable of forming an alloy together with lithium; Mb represents at least one element of metal elements and semimetal elements other than lithium and Ma; Mc represents at least one of the non-metal elements; Md represents at least one of metal elements and semimetal elements other than Ma; and s, t, u, p, q and r satisfy the following: $s>0$, $t≥0$, $u≥0$, $p>0$, $q>0$, and $r≥0$.

In addition, an inorganic compound not containing lithium (Li), such as $MnO_2$, $V_2O_5$, $V_6O_{13}$, NiS, and MoS may be used in the anode electrode.

The embodiments of the present application further provide an electrochemical device comprising the anode electrode according to embodiments of the present application. In some embodiments, the electrochemical device is a lithium ion battery. The lithium ion battery comprises the anode electrode of the present application, a cathode electrode, an separator, and an electrolyte, where the anode electrode, the cathode electrode, and the separator are layered structures, and can be applied to forming an electrode assembly with a wound or laminated structure, and be further used in the following various electrochemical devices, comprising, but not limited to: a soft-shell, hard-shell, or cylindrical battery.

Figure 9:
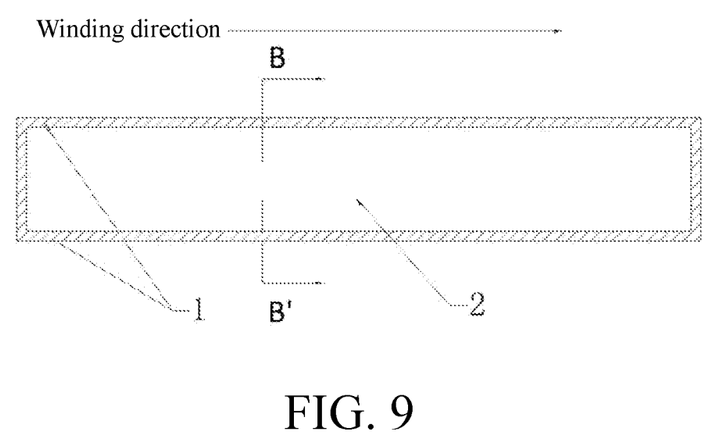
FIG. 9 is a schematic structural diagram of applying an anode electrode according to some embodiments of this application for winding a lithium ion battery.
Figure 10:
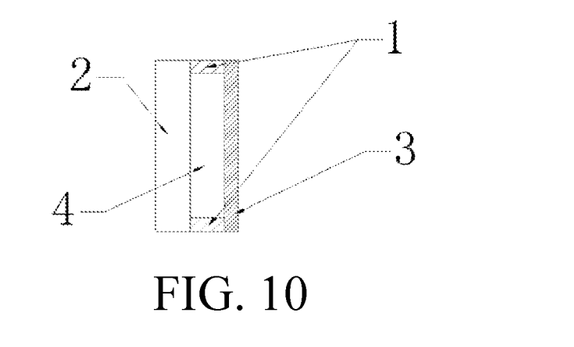
FIG. 10 is a cross-sectional view along the B-B' line shown in FIG. 9.
Figure 11:
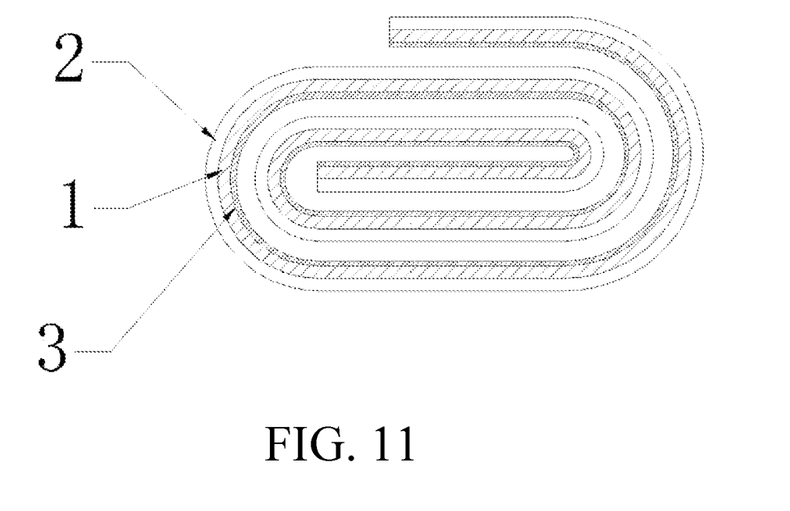
FIG. 11 is a schematic structural diagram of a wound structure of a lithium ion battery comprising an anode electrode according to some embodiments of the present application.

FIG. 9, FIG. 10, and FIG. 11 are schematic structural diagrams of wound structures of a lithium ion battery comprising an anode electrode according to some embodiments of the present application.

FIG. 9 is a schematic diagram of applying a current collector 2, an insulation layer 1, and a protection layer 3 (not shown) of the anode electrode for winding a lithium ion battery. FIG. 10 is a cross-sectional view of a transverse structure of the anode electrode along the B-B' line shown in FIG. 9, where the current collector 2, the insulation layer 1, and the protection layer 3 define a cavity 4. Specifically, after being wound according to a winding direction in FIG. 9, the anode electrode in FIG. 9 and FIG. 10 can form a wound battery (wherein the cathode electrode is not shown) as shown in FIG. 11.

Although the anode electrode in FIG. 9, FIG. 10, and FIG. 11 comprises the insulation layer 1 and the protection layer 3 only on a single surface, and the insulation layer 1 does not coat the lateral side of the current collector 2, FIG. 9, FIG. 10, and FIG. 11 herein are merely used for representing schematic structural diagrams of applying the anode electrode of the present application to a wound battery. A person skilled in the art should clearly understand that based on different uses and requirements, the anode electrode in other embodiments of the present application can alternatively be applied to a wound battery.

The lithium ion battery of the above-described embodiment further comprises an electrolyte. The electrolyte may be one or more of a gel electrolyte, a solid electrolyte, and an electrolytic solution. The electrolytic solution comprises a lithium salt and a nonaqueous solvent.

The lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoroborate. For example, $LiPF_6$ is selected as the lithium salt because it can provide a high ion conductivity and improve the cycle performance.

The nonaqueous solvent may be a carbonate compound, a carboxylate compound, an ether compound, other organic solvents, or a combination thereof.

The carbonate compound may be a chain carbonate ester compound, a cyclic carbonate compound, a fluorocarbonate compound, or a combination thereof.

Examples of the chain carbonate compound are diethyl carbonate (DEC), methyl carbonate (DMC), dipropyl carbonate (DPC), methyl propyl carbonate (MPC), ethyl propyl carbonate (EPC), methyl ethyl carbonate (MEC), and their combinations. Instances of the cyclic carbonate compound are ethylene carbonate (EC), propylene carbonate (PC), butylenes carbonate (BC), vinyl ethylidene carbonate (VEC), propyl propionate (PP), a combination thereof. Examples of the fluorocarbonate compound are fluorinated ethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene carbonate, 1-fluoro-1-methyl ethylene carbonate, 1,2-difluoro-1-methyl ethylene carbonate, 1,1,2-trifluoro-2-methyl ethylene carbonate, trifluoromethyl ethylene carbonate, and a combination thereof.

Examples of the carboxylate compound are methyl acetate, ethyl acetate, n-propyl acetate, tert-butyl acetate, methyl propionate, ethyl propionate, γ-butyrolactone, decalactone, valerolactone, mevalonolactone, caprolactone, methyl formate, and a combination thereof.

Examples of the ether compound are dibutyl ether, tetraethylene glycol dimethyl ether, diethylene glycol dimetyyl ether, 1,2-dimethoxyethane, 1,2-diethoxyethane, ethoxymethoxyethane, 2-methyltetrahydrofuran, tetrahydrofuran, and a combination thereof.

Examples of other organic solvents are dimethyl sulfoxide, 1,2-dioxolane, sulfolane, methylsulfolane, 1,3-dimethyl-2-imidazolldone, N-methyl-2-pyrrolidone, formamide, dimethyl formamide, acetonitrile, trimethyl phosphate, triethyl phosphate, trioctyl phosphate, phosphate ester, and a combination thereof.

According to the embodiments of the present application, the lithium ion battery further comprises a separator, when lithium ions in the electrolyte are allowed to pass through the separator in the lithium ion battery, the separator in the lithium ion battery avoids direct physical contact between the anode electrode and the cathode electrode and prevent occurrence of a short circuit. In some embodiment of the present application, the protection layer of the anode electrode may be used to replace the separator, to reduce the volume of the lithium ion battery and increase energy density per unit battery of the lithium ion battery, so that an uniform lithium ion conduction channel can be formed, thereby optimizing the deposition morphology of lithium metal.

In some embodiments of the present application, the protection layer of the anode electrode may completely or partially isolate the contact between the electrolytic solution and the current collector, to improve coulombic efficiency of the electrochemical device, and the protection layer may improve internal mechanical performance of the electrochemical device, to inhibit formation and growth of lithium dendrites.

Although a lithium ion battery was used above as an example for description, after reading the present application, a person skilled in the art can conceive of applying the anode electrode according to embodiments of the present application to any other suitable electrochemical devices. Such an electrochemical device includes any device that generates an electrochemical reaction, and its specific examples include all kinds of primary batteries, secondary batteries, fuel cells, solar cells, or capacitors. In particular, the electrochemical device is a lithium secondary battery, including a lithium metal secondary battery, a lithium-ion secondary battery, a lithium polymer secondary battery or a lithium ion polymer secondary battery.

The technical solutions of the present application are further described below with reference to embodiments, but are not limited thereto. Any amendment or equivalent replacement made on the technical solutions of the present application without departing from the scope of the technical solutions of the present application should fall within the protection scope of the present application.

Embodiments

Testing method for comparative embodiments and embodiments:

The statues of the deposition of lithium metal inside lithium ion batteries prepared in the following comparative embodiments and embodiments after multiple times of battery cycle were measured and determined by using the following testing methods, and the testing methods comprise:

1. Cycle performance test: Single-layered laminated lithium ion batteries containing lithium cobalt oxide cathode material in the following embodiments and comparative embodiments were charged to 4.48 V at a charge rate of 0.2 C at the room temperature, then, were charged at a constant voltage until the charge-discharge rate reaches 0.05 C, and then, were discharged at a charge-discharge rate of 0.2 C to 3.0 V. This was a charging and discharging cycling process, the above-described process was repeated, and the lithium ion batteries were cycled 10, 50, and 100 times, respectively.

2. Lithium metal deposition test: Electrode assemblies of the single-layered laminated lithium ion batteries cycled 10, 50, and 100 times were disassembled, and subsequently, an optical microscope was used to observe whether lithium metal deposition on the surface of the anode electrode exceeds the extent of the anode current collector.

Specific implementations of embodiments and comparative embodiments formed by the anode electrode according to the present application are described in detail below.

Comparative Embodiment 1

1.1 Preparation of a Cathode Electrode

Cathode active material of lithium cobalt oxide ($LiCoO_2$), conductive carbon black (Super P), and polyvinylidene fluoride (PVDF) were mixed according to a weight ratio 97.5:1.0:1.5, and N-methylpyrrolidone (NMP) was added as a solvent to formulate them into slurry having a solid material content ratio of 0.75. The slurry was evenly stirred. After that, the slurry was evenly coated on cathode current collector of aluminum foil, and was dried under a condition of 90° C., to obtain a cathode electrode.

1.2 Preparation of an Electrolyte

In the atmosphere of approximately 99.8% dry argon (Ar), organic solvents, ethylene carbonate (EC), methyl ethyl carbonate (EMC), and diethyl carbonate (DEC), were first mixed at a weight ratio of EC:EMC:DEC=30:50:20, then, a lithium salt, lithium hexafluorophosphate ($LiPF_6$), was fed into the evenly mixed organic solvents, and the solution was evenly mixed, to obtain an electrolyte whose concentration of lithium salt was 1.15 M.

1.3 Preparation of a Lithium Ion Battery

The cathode electrode (50×30 mm), a separator (polyethylene (PE), 54×34 mm), and anode current collector (copper foil)(52×32 mm) were laminated sequentially to align their centers and edges parallel, and after being fixed, formed an electrode assembly with a laminated structure, subsequently, a top edge and two side edges of the electrode assembly were packaged. And then, after the electrolyte was injected into the electrode assembly and a bottom edge of the electrode assembly was packaged, a lithium metal laminated battery was finally obtained.

Comparative Embodiment 2

2.1 Preparation of an Anode Electrode

A lithium metal layer with a thickness of 15 μm was deposited on a surface of anode current collector of copper foil in a physical vapor deposition (PVD) manner, to obtain a lithium metal anode electrode.

2.2 Preparation of a Cathode Electrode

Cathode active material of lithium cobalt oxide ($LiCoO_2$), conductive carbon black (Super P), and polyvinylidene fluoride (PVDF) were mixed according to a weight ratio 97.5:1.0:1.5, and N-methylpyrrolidone (NMP) was added as a solvent to formulate them into slurry having a solid material content ratio of 0.75. The slurry was evenly stirred. After that, the slurry was evenly coated on cathode current collector aluminum foil, and was dried under a condition of 90° C., to obtain a cathode electrode.

2.3 Preparation of an Electrolyte

In the atmosphere of approximately 99.8% dry argon (Ar), organic solvents, ethylene carbonate (EC), methyl ethyl carbonate (EMC), and diethyl carbonate (DEC), were first mixed at a weight ratio of EC:EMC:DEC=30:50:20, then, a lithium salt, lithium hexafluorophosphate ($LiPF_6$), was fed into the evenly mixed organic solvents, and the solution was evenly mixed, to obtain an electrolyte whose concentration of lithium salt was 1.15 M.

2.4 Preparation of a Lithium Ion Battery

The cathode electrode (50×30 mm), an separator (polyethylene (PE), 54×34 mm), and a lithium metal anode electrode (52×32 mm) were laminated sequentially to align their centers and edges parallel, and after being fixed, formed an electrode assembly with a laminated structure, subsequently, a top edge and two side edges of the electrode assembly were packaged. And then, after the electrolyte was injected into the electrode assembly and a bottom edge of the electrode assembly was packaged, a lithium metal laminated battery was finally obtained.

Comparative Embodiment 3

3.1 Preparation of an Anode Electrode

A layer of polyethylene oxide (PEO) nanofiber film whose thickness was 30 μm and whose porosity was 85% was deposited on a surface of anode current collector of copper foil in an electrostatic spinning manner, to obtain an anode electrode.

3.2 Preparation of a Cathode Electrode

Cathode active material of lithium cobalt oxide ($LiCoO_2$), conductive carbon black (Super P), and polyvinylidene fluoride (PVDF) were mixed according to a weight ratio 97.5:1.0:1.5, and N-methylpyrrolidone (NMP) was added as a solvent to formulate them into slurry having a solid material content ratio of 0.75. The slurry was evenly stirred. The slurry was evenly coated on cathode current collector of aluminum foil, and was dried under a condition of 90° C., to obtain a cathode electrode.

3.3 Preparation of an Electrolyte

In the atmosphere of approximately 99.8% dry argon (Ar), organic solvents, ethylene carbonate (EC), methyl ethyl carbonate (EMC), and diethyl carbonate (DEC), were first mixed at a weight ratio of EC:EMC:DEC=30:50:20, then, a lithium salt, lithium hexafluorophosphate ($LiPF_6$), was fed into the evenly mixed organic solvents, and the solution was evenly mixed, to obtain an electrolyte whose concentration of lithium salt was 1.15 M.

3.4 Preparation of a Lithium Ion Battery

The cathode electrode (50×30 mm), an separator (polyethylene (PE), 54×34 mm), and the anode electrode (52×32 mm) were laminated sequentially to align their centers and edges parallel, and after being fixed, formed an electrode assembly with a laminated structure, subsequently, a top edge and two side edges of the electrode assembly were packaged, and then, after the electrolyte was injected into the electrode assembly and a bottom edge of the electrode assembly was packaged, a lithium metal laminated battery was finally obtained.

Comparative Embodiment 4

4.1 Preparation of a Cathode Electrode

Cathode active material lithium of cobalt oxide ($LiCoO_2$), conductive carbon black (Super P), and polyvinylidene fluoride (PVDF) were mixed according to a weight ratio 97.5:1.0:1.5, and N-methylpyrrolidone (NMP) was added as a solvent to formulate them into slurry having a solid material content ratio of 0.75. The slurry was evenly stirred. The slurry was evenly coated on cathode current collector of aluminum foil, and was dried under a condition of 90° C., to obtain a cathode electrode.

4.2 Preparation of a Gel Electrolyte (1) Preparation of a polymer film: In an isolation box containing the atmosphere of approximately 99.8% dry argon (Ar), polyvinylidene fluoride-hexafluoropropylene (PVDF-HFP), whose average molecular weight was 30000 was dissolved in acetonitrile, the polyvinylidene fluoride-hexafluoropropylene and the acetonitrile were mixed according to a weight ratio of 5:95, and then, the mixing container was sealed to prevent the solvent from being volatilized and affecting the thickness of the film. Subsequently, the polymer solution was evenly stirred and stood for two hours to eliminate air bubbles. In the isolation box, the polymer solution was poured into a polytetrafluoroethylene mold, and stood until there was no flowing liquid in the mold. The resultant was transferred to a vacuum drying box to be dried at a temperature of 50° C. for 1 hour, and then, the temperature was increased to 80° C. until the film was completely dried. The dried sample was then removed from the mold, and was shaped through punching in to a thin polymer film.

(2) Preparation of an electrolyte: In the atmosphere of approximately 99.8% dry argon (Ar), organic solvents, ethylene carbonate (EC), methyl ethyl carbonate (EMC), and diethyl carbonate (DEC), were first mixed at a mass ratio of EC:EMC:DEC=30:50:20, then, a lithium salt, lithium hexafluorophosphate ($LiPF_6$), was added into the organic solvents, and the solution was evenly mixed, to obtain an electrolyte whose concentration of lithium salt was 1.15 M.

(3) Preparation of a gel polymer electrolyte: The above-described polymer film was immersed in the electrolyte for 40 minutes and then, was taken out, to obtain a gel electrolyte.

4.3 Preparation of a Lithium Ion Battery

The cathode electrode (50×30 mm), the gel electrolyte (50×30 mm), an separator (polyethylene (PE), 54×34 mm), and anode current collector of copper foil (52×32 mm) were laminated sequentially to align their centers and edges parallel, after being fixed, formed an electrode assembly with a laminated structure, and subsequently, were packaged, to obtain a lithium metal laminated battery.

Embodiment 1

1.1 Preparation of an Anode Electrode

A surface of anode current collector of copper foil was coated with a polypropylene (PP) insulation layer with a thickness of 30 μm and a width of 5 mm by the method of coating on a periphery thereof. Subsequently, the insulation layer was covered with a polyethylene (PE) protection layer with a porosity of 40%, to align its edge with an edge of the current collector, and an edge press fitting was performed by using stainless steel heat pressing plates at a temperature of 180° C., where pressure was set to 0.2 Mpa, and a pressing time period was 3 seconds.

1.2 Preparation of a Cathode Electrode

Cathode active material of lithium cobalt oxide ($LiCoO_2$), conductive carbon black (Super P), and polyvinylidene fluoride (PVDF) were mixed according to a weight ratio 97.5:1.0:1.5, and N-methylpyrrolidone (NMP) was added as a solvent to formulate them into slurry having a solid material content ratio of 0.75. The slurry was evenly stirred. The slurry was evenly coated on cathode current collector of aluminum foil, and was dried under a condition of 90° C., to obtain a cathode electrode.

1.3 Preparation of an Electrolyte

In the atmosphere of approximately 99.8% dry argon (Ar), organic solvents, ethylene carbonate (EC), methyl ethyl carbonate (EMC), and diethyl carbonate (DEC), were first mixed at a weight ratio of EC:EMC:DEC=30:50:20, then, a lithium salt, lithium hexafluorophosphate ($LiPF_6$), was fed into the evenly mixed organic solvents, and the solution was evenly mixed, to obtain an electrolyte whose concentration of lithium salt was 1.15 M.

1.4 Preparation of a Lithium Ion Battery

The cathode electrode (50×30 mm) and the anode electrode (52×32 mm) covered with the protection layer were laminated sequentially to align their centers and edges parallel, and after being fixed, formed an electrode assembly with a laminated structure, subsequently, a top edge and two side edges of the electrode assembly were packaged, and then, after the electrolyte was injected into the electrode assembly and a bottom edge of the electrode assembly was packaged, a lithium metal laminated battery was finally obtained.

Embodiment 2

2.1 Preparation of an Anode Electrode

A surface of anode current collector of copper foil was coated with a polytetrafluoroethylene (PTFE) insulation layer with a thickness of 30 μm and a width of 5 mm by the method of coating on a periphery thereof. Subsequently, the insulation layer was covered with a pore-broached polyethylene (PE) protection layer, to align its edge with an edge of the current collector, and an edge press fitting was performed by using stainless steel heat pressing plates at a temperature of 180° C., where pressure was set to 0.2 Mpa, and a pressing time period was 3 seconds.

2.2 Preparation of a Cathode Electrode

Cathode active material of lithium cobalt oxide (LiCoO$_2$), conductive carbon black (Super P), and polyvinylidene fluoride (PVDF) were mixed according to a weight ratio 97.5:1.0:1.5, and N-methylpyrrolidone (NMP) was added as a solvent to formulate them into slurry having a solid material content ratio of 0.75. The slurry was evenly stirred. The slurry was evenly coated on cathode current collector of aluminum foil, and was dried under a condition of 90° C., to obtain a cathode electrode.

2.3 Preparation of an Electrolyte

In the atmosphere of approximately 99.8% dry argon (Ar), organic solvents, ethylene carbonate (EC), methyl ethyl carbonate (EMC), and diethyl carbonate (DEC), were first mixed at a weight ratio of EC:EMC:DEC=30:50:20, then, a lithium salt, lithium hexafluorophosphate (LiPF$_6$), was fed into the evenly mixed organic solvents, and the solution was evenly mixed, to obtain an electrolyte whose concentration of lithium salt was 1.15 M.

2.4 Preparation of a Lithium Ion Battery

The cathode electrode (50×30 mm) and the anode electrode (52×32 mm) covered with the protection layer were laminated sequentially to align their centers and edges parallel, and after being fixed, formed an electrode assembly with a laminated structure, subsequently, a top edge and two side edges of the electrode assembly were packaged, and then, after the electrolyte was injected into the electrode assembly and a bottom edge of the electrode assembly was packaged, a lithium metal laminated battery was finally obtained.

Embodiment 3

3.1 Preparation of an Anode Electrode

A surface of anode current collector of copper foil was coated with a polypropylene (PP) insulation layer with a thickness of 30 μm and a width of 5 mm by the method of coating on a periphery thereof. Subsequently, the insulation layer was covered with a dense polyethylene oxide (PEO) protection layer with a thickness of 15 μm, to align its edge with an edge of the current collector, and an edge press fitting was performed by using stainless steel heat pressing plates at a temperature of 90° C., where pressure was set to 0.2 Mpa, and a pressing time period was 3 seconds.

3.2 Preparation of a Cathode Electrode

Cathode active material of lithium cobalt oxide (LiCoO$_2$), conductive carbon black (Super P), and polyvinylidene fluoride (PVDF) were mixed according to a weight ratio 97.5:1.0:1.5, and N-methylpyrrolidone (NMP) was added as a solvent to formulate them into slurry having a solid material content ratio of 0.75. The slurry was evenly stirred. The slurry was evenly coated on cathode current collector of aluminum foil, and was dried under a condition of 90° C., to obtain a cathode electrode.

3.3 Preparation of an Electrolyte

In the atmosphere of approximately 99.8% dry argon (Ar), organic solvents, ethylene carbonate (EC), methyl ethyl carbonate (EMC), and diethyl carbonate (DEC), were first mixed at a weight ratio of EC:EMC:DEC=30:50:20, then, a lithium salt, lithium hexafluorophosphate (LiPF$_6$), was fed into the evenly mixed organic solvents, and the solution was evenly mixed, to obtain an electrolyte whose concentration of lithium salt was 1.15 M.

3.4 Preparation of a Lithium Ion Battery

The cathode electrode (50×30 mm) and the anode electrode (52×32 mm) covered with the protection layer were laminated sequentially to align their centers and edges parallel, and after being fixed, formed an electrode assembly a laminated structure, subsequently, a top edge and two side edges of the electrode assembly were packaged, and then, after the electrolyte was injected into the electrode assembly and a bottom edge of the electrode assembly was packaged, a lithium metal laminated battery was finally obtained.

Embodiment 4

4.1 Preparation of an Anode Electrode

A lithium metal layer whose thickness was 15 μm was deposited on a surface of anode current collector of copper foil in a physical vapor deposition (PVD) manner. An edge of the lithium metal layer was distant from an edge of a current collector by 5 mm. A periphery of the lithium metal, that is, a periphery of a surface of the current collector, was coated with a polypropylene (PP) insulation layer with a thickness of 30 μm and a width of 5 mm. Subsequently, the insulation layer was covered with a polyethylene (PE) protection layer with a porosity of 40%, to align its edge with an edge of the current collector, and an edge press fitting was performed by using stainless steel heat pressing plates at a temperature of 180° C., where pressure was set to 0.2 Mpa, and a pressing time period was 3 seconds.

4.2 Preparation of a Cathode Electrode

Cathode active material of lithium cobalt oxide (LiCoO$_2$), conductive carbon black (Super P), and polyvinylidene fluoride (PVDF) were mixed according to a weight ratio 97.5:1.0:1.5, and N-methylpyrrolidone (NMP) was added as a solvent to formulate them into slurry having a solid material content ratio of 0.75. The slurry was evenly stirred. The slurry was evenly coated on cathode current collector of aluminum foil, and was dried under a condition of 90° C., to obtain a cathode electrode.

4.3 Preparation of an Electrolyte

In the atmosphere of approximately 99.8% dry argon (Ar), organic solvents, ethylene carbonate (EC), methyl ethyl carbonate (EMC), and diethyl carbonate (DEC), were first mixed at a weight ratio of EC:EMC:DEC=30:50:20, then, a lithium salt, lithium hexafluorophosphate (LiPF$_6$), was fed into the evenly mixed organic solvents, and the solution was evenly mixed, to obtain an electrolyte whose concentration of lithium salt was 1.15 M.

4.4 Preparation of a Lithium Ion Battery

The cathode electrode (50×30 mm) and the anode electrode (60×40 mm) covered with a protection layer were laminated sequentially to align their centers and edges parallel, and after being fixed, formed an electrode assembly a laminated structure, subsequently, a top edge and two side edges of the electrode assembly were packaged, and then, after the electrolyte was injected into the electrode assembly and a bottom edge of the electrode assembly was packaged, a lithium metal laminated battery was finally obtained.

Embodiment 5

5.1 Preparation of an Anode Electrode

A layer of polyethylene oxide (PEO) nanofiber film with a thickness of 30 μm and a porosity of 85% was deposited on a surface of anode current collector of copper foil in an electrostatic spinning manner. An edge of the polyethylene oxide (PEO) nanofiber film was distant from an edge of a current collector by 5 mm. A periphery of the polyethylene oxide (PEO), that is, a periphery of a surface of the current collector, was coated with a polypropylene (PP) insulation layer with a thickness of 30 μm and a width of 5 mm. Subsequently, the insulation layer was covered with a polyethylene (PE) protection layer with a porosity of 40%, to align its edge with an edge of the current collector, and an edge press fitting was performed by using stainless steel heat pressing plates at a temperature of 180° C., where pressure was set to 0.2 Mpa, and a pressing time period was 3 seconds.

5.2 Preparation of a Cathode Electrode

Cathode active material of lithium cobalt oxide (LiCoO$_2$), conductive carbon black (Super P), and polyvinylidene fluoride (PVDF) were mixed according to a weight ratio 97.5:1.0:1.5, and N-methylpyrrolidone (NMP) was added as a solvent to formulate them into slurry having a solid material content ratio of 0.75. The slurry was evenly stirred. The slurry was evenly coated on cathode current collector of aluminum foil, and was dried under a condition of 90° C., to obtain a cathode electrode.

5.3 Preparation of an Electrolyte

In the atmosphere of approximately 99.8% dry argon (Ar), organic solvents, ethylene carbonate (EC), methyl ethyl carbonate (EMC), and diethyl carbonate (DEC), were first mixed at a weight ratio of EC:EMC:DEC=30:50:20, then, a lithium salt, lithium hexafluorophosphate (LiPF$_6$), was fed into the evenly mixed organic solvents, and the solution was evenly mixed, to obtain an electrolyte whose concentration of lithium salt was 1.15 M.

5.4 Preparation of a Lithium Ion Battery

The cathode electrode (50×30 mm) and the anode electrode (60×40 mm) covered with a protection layer were laminated sequentially to align their centers and edges parallel, and after being fixed, formed an electrode assembly with a laminated structure, subsequently, a top edge and two side edges of the electrode assembly were packaged, and then, after the electrolyte was injected into the electrode assembly and a bottom edge of the electrode assembly was packaged, a lithium metal laminated battery was finally obtained.

Embodiment 6

6.1 Preparation of an Anode Electrode

A surface of anode current collector of copper foil was coated with a polypropylene (PP) insulation layer with a thickness of 30 μm and a width of 5 mm on the periphery thereof. Subsequently, the insulation layer was covered with a polyethylene (PE) protection layer with a porosity of 40%, to align its edge with an edge of the current collector, and an edge press fitting was performed by using stainless steel heat pressing plates at a temperature of 180° C., where pressure was set to 0.2 Mpa, and a pressing time period was 3 seconds.

6.2 Preparation of a Cathode Electrode

Cathode active material of lithium cobalt oxide (LiCoO$_2$), conductive carbon black (Super P), and polyvinylidene fluoride (PVDF) were mixed according to a weight ratio 97.5:1.0:1.5, and N-methylpyrrolidone (NMP) was added as a solvent to formulate them into slurry having a solid material content ratio of 0.75. The slurry was evenly stirred. The slurry was evenly coated on cathode current collector of aluminum foil, and was dried under a condition of 90° C., to obtain a cathode electrode.

6.3 Preparation of a Gel Electrolyte (1) Preparation of a polymer film: In an isolation box containing the atmosphere of approximately 99.8% dry argon (Ar), polyvinylidene fluoride-hexafluoropropylene (PVDF-HFP), whose average molecular weight was 30000 was dissolved in acetonitrile, the polyvinylidene fluoride-hexafluoropropylene and the acetonitrile were mixed according to a weight ratio of 5:95, and then, the mixing container was sealed to prevent the solvent from being volatilized and affecting the thickness of the film. Subsequently, the polymer solution was evenly stirred and stood for two hours to eliminate air bubbles. In the isolation box, the polymer solution was poured into a polytetrafluoroethylene mold, and stood until there was no flowing liquid in the mold. The resultant was transferred to a vacuum drying box to be dried at a temperature of 50° C. for 1 hour, and then, the temperature was increased to 80° C. until the film was completely dried. The dried sample was then removed from the mold, and was shaped through punching in to a thin polymer film.

(2) Preparation of an electrolyte: In the atmosphere of approximately 99.8% dry argon (Ar), organic solvents, ethylene carbonate (EC), methyl ethyl carbonate (EMC), and diethyl carbonate (DEC), were first mixed at a weight ratio of EC:EMC:DEC=30:50:20, then, a lithium salt, lithium hexafluorophosphate (LiPF$_6$), was fed into the evenly mixed organic solvents, and the solution was evenly mixed, to obtain an electrolyte whose concentration of lithium salt was 1.15 M.

(3) Preparation of a gel polymer electrolyte: The above-described polymer film was immersed in the organic electrolyte for 40 minutes and then, was taken out, to obtain a gel electrolyte.

6.4 Preparation of a Lithium Ion Battery

The cathode electrode (50×30 mm), the gel electrolyte (50×30 mm), and the anode current collector (60×40 mm) covered with a protection layer were laminated sequentially to align their centers and edges parallel, after being fixed, formed an electrode assembly with a laminated structure, and were packaged, to finally obtain a lithium metal laminated battery.

Embodiment 7

7.1 Preparation of an Anode Electrode

A surface of anode current collector of copper foil was coated with a polypropylene (PP) insulation layer with a thickness of 30 μm and a width of 5 mm on the periphery thereof. Subsequently, the insulation layer was covered with a tensioned polyethylene (PE) protection layer with a porosity of 40%, and an edge press fitting was performed by using stainless steel heat pressing plates at a temperature of 180° C. when the protection layer was in a tensioned state (not in contact with the current collector), where pressure was set to 0.2 Mpa, and a pressing time period was 3 seconds.

7.2 Preparation of a Cathode Electrode

Cathode active material of lithium cobalt oxide ($LiCoO_2$), conductive carbon black (Super P), and polyvinylidene fluoride (PVDF) were mixed according to a weight ratio 97.5:1.0:1.5, and N-methylpyrrolidone (NMP) was added as a solvent to formulate them into slurry having a solid material content ratio of 0.75. The slurry was evenly stirred. The slurry was evenly coated on cathode current collector of aluminum foil, and was dried under a condition of 90° C., to obtain a cathode electrode.

7.3 Preparation of an Electrolyte

In the atmosphere of approximately 99.8% dry argon (Ar), organic solvents, ethylene carbonate (EC), methyl ethyl carbonate (EMC), and diethyl carbonate (DEC), were first mixed at a weight ratio of EC:EMC:DEC=30:50:20, then, a lithium salt, lithium hexafluorophosphate ($LiPF_6$), was fed into the evenly mixed organic solvents, and the solution was evenly mixed, to obtain an electrolyte whose concentration of lithium salt was 1.15 M.

7.4 Preparation of a Lithium Ion Battery

The cathode electrode (50×30 mm) and the anode electrode (60×40 mm) covered with a protection layer were laminated sequentially to align their centers and edges parallel, and after being fixed, formed an electrode assembly with a laminated structure, subsequently, a top edge and two side edges of the electrode assembly were packaged, and then, after the electrolyte was injected into the electrode assembly and a bottom edge of the electrode assembly was packaged, a lithium metal laminated battery was finally obtained.

Comparative embodiments 1-4 and Embodiments 1-7 were separately subject to cycle performance and lithium metal deposition tests. Refer to Table 1 below for test results:

TABLE 1

| | Experimental condition | | | | | After cycled for N times, does lithium metal deposition exceed the extent of a anode current collector | | |
|---|---|---|---|---|---|---|---|---|
| | Insulation layer | Anode electrode | Electrolyte | Protection layer | Is a protection layer in contact with a current collector? | N = 10 | N = 50 | N = 100 |
| Comparative embodiment 1 | None | Only anode current collector | Liquid | None | — | Yes | Yes | Yes |
| Comparative embodiment 2 | None | Lithium metal anode electrode | Liquid | None | — | Yes | Yes | Yes |
| Comparative embodiment 3 | None | PEO anode electrode | Liquid | None | — | No | Yes | Yes |
| Comparative embodiment 4 | None | Only anode current collector | Gel | None | — | No | Yes | Yes |
| Embodiment 1 | PP | Only anode current collector | Liquid | Pore-broached PE | Yes | No | No | No |
| Embodiment 2 | PTFE | Only anode current collector | Liquid | Pore-broached PE | Yes | No | No | No |
| Embodiment 3 | PP | Only anode current collector | Liquid | Dense PEO | Yes | No | No | No |
| Embodiment 4 | PP | Lithium metal anode electrode | Liquid | Pore-broached PE | Yes | No | No | No |
| Embodiment 5 | PP | PEO anode electrode | Liquid | Pore-broached PE | Yes | No | No | No |
| Embodiment 6 | PP | Only anode current collector | Gel | Pore-broached PE | Yes | No | No | No |
| Embodiment 7 | PP | Only anode current collector | Liquid | Pore-broached PE | No | No | No | No |

Data in Table 1 indicates that compared with the comparative embodiments, embodiments comprising the anode electrode provided by the present application can effectively prevent irregular deposition of lithium metal even if insulation layers were made of different materials, anode materials of anode electrodes were different, the embodiments were in different electrolytes, and different materials were used for protection layers thereof, or no matter whether a protection layer was in contact with a current collector. Therefore, all the anode electrodes provided in the embodiments of the present application can define the direction and extent of lithium metal deposition, thereby avoiding lithium metal deposition from coming into contact with a cathode current collector or a tab.

The wording "some embodiments in the present application" or a similar term that appears in this specification, with reference to its purpose, is intended to point out that a specific feature, structure, or property described together with another embodiment is included in at least one embodiment and is not necessarily presented in all embodiments. Therefore, when the wording "some embodiments in the present application" or a similar term correspondingly appears throughout this specification, it do not necessarily represent a same embodiment.

The above description summarizes the features of several embodiments, which enables those of ordinary skill in the art to understand the various aspects of the present application. Those of ordinary skill in the art can readily use the present application as a basis for designing or modifying other compositions to achieve the same objectives and/or the same advantages as the embodiments herein. It is also to be understood by those of ordinary skill in the art that these equal examples do not depart from the spirit and scope of the present application, and it is possible to make various changes, substitutions and modifications to the present application without departing from the spirit and scope of the present application. Although the methods disclosed herein have been described with reference to the specific operations that are performed in a specific order, it should be understood that these operations can be combined, subdivided, or reordered to form an equivalent method without departing from the teachings of the present application. Therefore, the order and grouping of operations are not a limitation to the present application unless specifically indicated herein.

What is claimed is:

1. An anode electrode, comprising:
   a current collector comprising a first surface and a second surface opposite to the first surface;
   an insulation layer being disposed on a peripheral portion of the first surface; and
   a protection layer being disposed on the insulation layer and covering the first surface, wherein the protection layer is a flexible film, the protection layer is in direct contact with at least a portion of the first surface of the current collector, and the first surface of the current collector, the protection layer and the insulation layer define a cavity, wherein the insulation layer is an ionic and electronic insulator, and the protection layer either has ionic conductivity or is a porous non-ionic conductor, wherein the thickness of the protection layer ranges from approximately 1 μm to approximately 50 μm.

2. The anode electrode according to claim 1, wherein the porosity of the protection layer ranges from approximately 0% to approximately 60%.

3. The anode electrode according to claim 1, wherein the porosity of the protection layer ranges from approximately 20% to approximately 60%.

4. The anode electrode according to claim 1, wherein the thickness of the insulation layer ranges from approximately 3 μm to approximately 80 μm, and the width thereof ranges from approximately 0.5 mm to approximately 20 mm.

5. The anode electrode according to claim 1, wherein the insulation layer is selected from the group consisting of: polyimide, polyamide, polyvinyl fluoride, polyetheretherketone, polyethylene, polypropylene, polyvinylidene chloride, polytetrafluoroethylene, polyurethane, aluminum oxide, aluminum hydroxide, boron nitride, and their derivatives and a combination thereof.

6. The anode electrode according to claim 4, wherein the material of the protection layer comprises polymer or a mixture of polymer and inorganic material, wherein:
   the polymer is selected from the group consisting of: polypropylene, polyethylene, polyvinylidene fluoride-hexafluoropropylene, polyvinylidene fluoride, polyacrylonitrile, polymethylmethacrylate, polyphenylether, propylene carbonate, polyethylene oxide, and a combination thereof, and
   the inorganic material is selected from the group consisting of: $HfO_2$, $SrTiO_3$, $SnO_2$, $CeO_2$, MgO, NiO, CaO, BaO, ZnO, $ZrO_2$, $Al_2O_3$, $TiO_2$, $SiO_2$, $Li_3PO_4$, $Li_2O$, LiF, LiOH, $Li_2CO_3$, $LiAlO_2$, $Li_2O-Al_2O_3-SiO_2-P_2O_5-TiO_2-GeO_2$ ceramic material, $Li_{1+x+y}(Al, Ga)_x(Ti, Ge)_{2-x}Si_yP_{3-y}O_{12}$, wherein $0 \leq x \leq 1$ and $0 \leq y \leq 1$, lithium titanium phosphate $(Li_xTi_y(PO_4)_3$, wherein $0<x<2$ and $0<y<3)$, lithium-aluminum-titanium phosphate $(Li_xAl_yTi_z(PO_4)_3$, wherein $0<x<2$, $0<y<1$, and $0<z<3)$, lithium lanthanum titanate $(Li_xLa_yTiO_3$, wherein $0<x<2$ and $0<y<3)$, lithium germanium thiophosphate $(Li_xGe_yP_zS_w$, wherein $0<x<4$, $0<y<1$, $0<z<1$, and $0<w<5)$, lithium nitride $(Li_xN_y$, wherein $0<x<4$ and $0<y<2)$, $SiS_2$ glass material $(Li_xSi_yS_z$, wherein $0 \leq x<3$, $0<y<2$, and $0<z<4)$, $P_2S_5$ glass material $(Li_xP_yS_z$, wherein $0 \leq x<3$, $0<y<3$, and $0<z<7)$, garnet ceramic material $(Li_{3+x}La_3M_2O_{12}$, wherein $0 \leq x \leq 5$, and M is Te, Nb, or Zr), and a combination thereof.

7. The anode electrode according to claim 1, further comprising two or more protection layers.

8. The anode electrode according to claim 1, wherein the insulation layer is further disposed on a lateral side of the current collector.

9. The anode electrode according to claim 1, further comprising another insulation layer disposed on a peripheral portion of the second surface; and another protection layer disposed on the another insulation layer and covering the second surface, wherein said another protection layer is a flexible film, said another protection layer is in direct contact with at least a portion of the second surface of the current collector, and the second surface of the current collector, the another protection layer and the another insulation layer define a cavity, wherein the another insulation layer is an ionic and electronic insulator, and the another protection layer either has ionic conductivity or is a porous non-ionic conductor.

10. The anode electrode according to claim 9, wherein the porosity of said another protection layer ranges from approximately 0% to approximately 60%.

11. The anode electrode according to claim 9, wherein the porosity of said another protection layers ranges from approximately 20% to approximately 60%.

12. The anode electrode according to claim 1, further comprising another insulation layer disposed on the entire second surface.

13. An electrochemical device comprising the anode electrode according to claim 1.

14. The electrochemical device according to claim 13, wherein the electrochemical device is a lithium ion battery.

\* \* \* \* \*